US009453615B2

(12) United States Patent
Chen et al.

(10) Patent No.: US 9,453,615 B2
(45) Date of Patent: Sep. 27, 2016

(54) SENSING TYPE LIGHTING DEVICE WITH ELECTROMAGNETIC WIRELESS COMMUNICATION MODULE AND CONTROLLING METHOD THEREOF

(75) Inventors: Ming-Yun Chen, Dong Guan (CN); Chih-Hung Chen, Dong Guan (CN)

(73) Assignee: Linvingstyle Enterprises Limited, Dong Guan (CN)

( * ) Notice: Subject to any disclaimer, the term of this patent is extended or adjusted under 35 U.S.C. 154(b) by 440 days.

(21) Appl. No.: 13/979,469

(22) PCT Filed: Jan. 12, 2012

(86) PCT No.: PCT/CN2012/070296
§ 371 (c)(1),
(2), (4) Date: Jul. 12, 2013

(87) PCT Pub. No.: WO2012/095016
PCT Pub. Date: Jul. 19, 2012

(65) Prior Publication Data
US 2013/0285546 A1 Oct. 31, 2013

(30) Foreign Application Priority Data

| Jan. 12, 2011 | (CN) | 2011 2 0010049 U |
| Jan. 12, 2011 | (CN) | 2011 2 0010056 U |
| Jan. 12, 2011 | (CN) | 2011 2 0010066 U |
| Jan. 12, 2011 | (CN) | 2011 2 0010077 U |
| Jan. 12, 2011 | (CN) | 2011 2 0010089 U |
| Jan. 12, 2011 | (CN) | 2011 2 0010094 U |
| Jan. 12, 2011 | (CN) | 2011 2 0010100 U |
| Jan. 12, 2011 | (CN) | 2011 2 0010123 U |
| Jan. 12, 2011 | (CN) | 2011 2 0010126 U |
| Jan. 12, 2011 | (CN) | 2011 2 0010130 U |
| Jan. 12, 2011 | (CN) | 2011 2 0010141 U |
| Jan. 12, 2011 | (CN) | 2011 2 0010145 U |
| Jan. 12, 2011 | (CN) | 2011 2 0010153 U |
| Jan. 12, 2011 | (CN) | 2011 2 0010165 U |
| Jan. 12, 2011 | (CN) | 2011 2 0010170 U |
| Jan. 12, 2011 | (CN) | 2011 2 0010191 U |
| Jan. 12, 2011 | (CN) | 2011 2 0010199 U |
| Jan. 12, 2011 | (CN) | 2011 2 0010202 U |
| Jan. 12, 2011 | (CN) | 2011 2 0010205 U |
| Jan. 12, 2011 | (CN) | 2011 2 0010215 U |
| Jan. 12, 2011 | (CN) | 2011 2 0010218 U |

(51) Int. Cl.
*H05B 37/02* (2006.01)
*F21K 99/00* (2016.01)
(Continued)

(52) U.S. Cl.
CPC . *F21K 9/00* (2013.01); *F21K 9/13* (2013.01); *F21K 9/17* (2013.01); *F21V 23/0442* (2013.01);
(Continued)

(58) Field of Classification Search
CPC .......... H05B 33/0872; H05B 37/0272; H05B 37/0218; H05B 37/0245; H05B 37/02; H05B 37/029; F21K 9/175; F21K 9/534; F24F 11/0086; F24F 11/0012; F24F 11/0034; F24F 2011/0035; F24F 2011/0047; Y02B 20/46; Y02B 20/383
USPC ........... 315/50, 58, 112, 149, 153, 158, 291, 315/294, 297, 312
See application file for complete search history.

(56) References Cited

U.S. PATENT DOCUMENTS 5,499,262 A * 3/1996 Nakata ...................... F21S 9/02
359/668
(Continued)

FOREIGN PATENT DOCUMENTS

CN 201041297 3/2008
(Continued)

*Primary Examiner* — Haissa Philogene
(74) *Attorney, Agent, or Firm* — Kirton McConkie; Evan R. Witt

(57) ABSTRACT

A sensing type lighting device includes a lighting main body, a sensing element, and an electromagnetic wireless communication module. The lighting main body includes a controlling circuit and a light source set. The sensing element and the electromagnetic wireless communication module are disposed within the lighting main body. A controlling method for a sensing type lighting group includes the following steps. Firstly, a first lighting device with a first sensing element and a first electromagnetic wireless communication module is provided. Then, a second lighting device with a second electromagnetic wireless communication module is provided. According to an environmental sensing result of the first sensing element, a communication channel between the first and second electromagnetic wireless communication modules is established. Consequently, a light intensity of the first lighting device and/or the second lighting device is correspondingly controlled.

12 Claims, 16 Drawing Sheets

(51) Int. Cl.
*H05B 33/08* (2006.01)
*F21V 21/08* (2006.01)
*F21V 23/04* (2006.01)
*F21W 131/109* (2006.01)
*F21Y 101/02* (2006.01)

(52) U.S. Cl.
CPC ........... *H05B 33/0803* (2013.01); *F21V 21/08* (2013.01); *F21V 21/0824* (2013.01); *F21V 23/0435* (2013.01); *F21W 2131/109* (2013.01); *F21Y 2101/02* (2013.01); *Y02B 20/383* (2013.01)

(56) References Cited

U.S. PATENT DOCUMENTS

| | | | | |
|---|---|---|---|---|
| 5,707,139 A * | 1/1998 | Haitz | ...................... | H01S 5/423 362/231 |
| 6,350,041 B1 * | 2/2002 | Tarsa | ........................ | F21K 9/00 257/E33.072 |
| 7,014,336 B1 * | 3/2006 | Ducharme | ......... | H05B 33/0857 362/231 |
| 7,255,457 B2 * | 8/2007 | Ducharme | ......... | H05B 33/0857 362/231 |
| 7,350,936 B2 * | 4/2008 | Ducharme | ......... | H05B 33/0857 362/231 |
| 7,387,405 B2 * | 6/2008 | Ducharme | ......... | H05B 33/0857 362/231 |
| 7,520,634 B2 * | 4/2009 | Ducharme | ......... | H05B 33/0857 362/231 |
| 8,350,697 B2 * | 1/2013 | Trundle | ............... | F24F 11/0086 340/539.26 |
| 2003/0039122 A1 * | 2/2003 | Cao | ........................ | F21K 9/135 362/294 |
| 2004/0105261 A1 * | 6/2004 | Ducharme | ......... | H05B 33/0857 362/231 |
| 2006/0012987 A9 * | 1/2006 | Ducharme | ......... | H05B 33/0857 362/231 |
| 2006/0044152 A1 * | 3/2006 | Wang | .................. | H04L 12/2803 340/2.24 |
| 2006/0109649 A1 * | 5/2006 | Ducharme | ......... | H05B 33/0857 362/231 |
| 2006/0285325 A1 * | 12/2006 | Ducharme | ......... | H05B 33/0857 362/231 |
| 2007/0258240 A1 * | 11/2007 | Ducharme | ......... | H05B 33/0857 362/231 |
| 2010/0262297 A1 * | 10/2010 | Shloush | ............. | H05B 37/0218 700/276 |
| 2010/0296536 A1 * | 11/2010 | Tao | ........................ | F21K 9/137 372/36 |
| 2011/0115413 A1 * | 5/2011 | Erickson | ............... | H05B 37/029 315/312 |
| 2015/0156849 A1 * | 6/2015 | Chen | ................... | H05B 33/0854 315/112 |
| 2016/0073474 A1 * | 3/2016 | Van De Sluis | .... | H05B 37/0272 315/312 |

FOREIGN PATENT DOCUMENTS

| | | |
|---|---|---|
| CN | 201075878 | 6/2008 |
| CN | 201218439 | 8/2009 |
| CN | 201344381 | 11/2009 |
| CN | 101737700 | 6/2010 |
| CN | 201651853 | 11/2010 |

\* cited by examiner

SENSING TYPE LIGHTING DEVICE WITH ELECTROMAGNETIC WIRELESS COMMUNICATION MODULE AND CONTROLLING METHOD THEREOF

FIELD OF THE INVENTION

The present invention relates to a sensing type lighting technology, and more particularly to a sensing type lighting device with a wireless communication function, a sensing type lighting group and a controlling method thereof.

BACKGROUND OF THE INVENTION

Nowadays, lighting devices are widely used in workshops, working platforms, walkways, offices, houses, roads, courtyards, public places, or a variety of indoor/outdoor environments, and bring a lot of convenience to the human lives. For example, the wisely-used lighting devices at least comprise light bulbs, light tubes, various lamps (e.g. a ceiling lamp or a garden lamp) or various work lamps (e.g. a work lamp with a humidifying function or a work lamp with a spraying function). The light sources used in these lighting devices are for example incandescent light bulbs, fluorescent lamps or environmentally-friendly and power-saving LED lamps.

Conventionally, a sensing element is additionally installed on the lighting device in order to achieve the power-saving efficacy of the lighting device. For example, the sensing element is a passive infrared human body sensor (PIR) for sensing a motion of a human body or a microwave sensor with a fast response speed and high sensitivity. Generally, the sensing type lighting device with the sensing element can implement automatic sensitive lighting control to some extent in order to achieve the power-saving purpose.

However, a unitary (or independent) sensing type lighting device is not widely adopted because the cost of initial installation is very high. On the other hand, if the unitary (or independent) sensing type lighting device and another sensing type lighting device cooperate, the lighting interference or inconsistence between these two lighting devices or other adverse factors may cause inconvenience of using the lighting devices. Moreover, it is difficult to elaborately control and equilibrate the lighting effects of plural sensing type lighting devices within the same space by synchronously using the independent sensing control mechanisms of respective lighting devices.

Moreover, if a sensing type lighting device is expected to provide an additional control function, it may be difficult to implement a group control mechanism because the additional control function is independently implemented, or it is very costly to provide the sensing type lighting device with the additional control function.

Therefore, there is a need of providing an improved sensing type lighting device in order to overcome the above drawbacks.

SUMMARY OF THE INVENTION

For eliminating the drawbacks encountered from the prior art, an object of the present invention provides a sensing type lighting device with a wireless communication function.

Another object of the present invention provides a sensing type lighting group with a wireless communication function.

A further object of the present invention provides a wireless controlling method which is applied in a sensing type lighting group by using a wireless communication technology.

In accordance with an aspect of the present invention, there is provided a sensing type lighting device. The sensing type lighting device includes a lighting main body, a sensing element, and an electromagnetic wireless communication module. The lighting main body at least includes a controlling circuit and a light source set. The light source set is electrically connected with the controlling circuit. The sensing element is disposed within the lighting main body and electrically connected with the controlling circuit. The electromagnetic wireless communication module is disposed within the lighting main body and electrically connected with the controlling circuit.

In an embodiment, the sensing type lighting device is at least selected from one of a sensing type LED light bulb, a sensing type LED light tube, a sensing type lamp and a sensing type work lamp. The sensing type lamp is at least selected from a sensing type ceiling lamp or a sensing type garden lamp. The sensing type work lamp is at least selected from a sensing type work lamp with a spraying function or a sensing type work lamp with a humidifying function.

In an embodiment, the sensing type LED light bulb includes a bulb main body, and the bulb main body is used as the lighting main body. The sensing type LED light bulb further at least includes a male connector, a bulb casing, a LED light source set and a bulb cover. The male connector is located at a first end of the bulb casing. The LED light source set and the bulb cover are both disposed within the bulb casing and located at a second end of the bulb casing. The LED light source set is covered by the bulb cover, wherein the second end and the first end are opposed to each other.

In an embodiment, the bulb casing is a heat-dissipating structure with an accommodation part. The accommodation part is in communication with the first end and the second end for accommodating at least one electronic component of the controlling circuit. Moreover, plural fins are disposed on an outer surface of the heat-dissipating structure. The male connector is located at the first end of the heat-dissipating structure. The LED light source set and the bulb cover are both located at the second end of the heat-dissipating structure.

In an embodiment, the bulb cover is at least selected from one of a square cover, a cylindrical cover and a spherical cover.

In an embodiment, the sensing type LED light tube includes a tube main body, and the tube main body is used as the lighting main body. The sensing type LED light tube further at least includes two tube caps, a non-closed-circular tube casing, a LED light source set and a tube cover. The two tube caps are respectively located at two ends of the non-closed-circular tube casing. The LED light source set and the tube cover are both connected to an entrance of the non-closed-circular tube casing, and the LED light source set is covered by the tube cover.

In an embodiment, the non-closed-circular tube casing is a non-closed-circular heat-dissipating structure. Moreover, plural fins are disposed on an outer surface of the non-closed-circular heat-dissipating structure. The two tube caps are respectively located at the two ends of the circular heat-dissipating structure. The LED light source set and the tube cover are both connected to the entrance of the non-closed-circular heat-dissipating structure.

In an embodiment, the tube cover is a PVC tube cover, and the PVC tube cover and the non-closed-circular tube casing are combined as a closed circular tube main body.

In an embodiment, if the sensing type lighting device is at least selected from one of the sensing type ceiling lamp, the sensing type garden lamp, the sensing type work lamp with the spraying function and the sensing type work lamp with the humidifying function, the light source set is a LED light source set comprising plural LED chips, or the light source set is an incandescent light source set or a fluorescent light source set.

In an embodiment, the LED light source set includes plural LED chips. The plural LED chips have identical color temperature or luminance or chroma, or the color temperature or the luminance or the chroma of at least a portion of the plural LED chips is different from that of another portion of the plural LED chips.

In an embodiment, the sensing element is a passive infrared human body sensor or a microwave sensor.

In an embodiment, the electromagnetic wireless communication module is operated in a frequency band of an invisible light spectrum. The electromagnetic wireless communication module is at least selected from one of a 313.325 MHz wireless communication module, a 433 MHz wireless communication module, a 418 MHz wireless communication module, a 2.4 GHz wireless communication module, a 5.8 GHz wireless communication module, a 10 GHz wireless communication module, a Bluetooth wireless communication module, a Wi-Fi wireless communication module, a NFC wireless communication module, a Z-Wave wireless communication module and a ZigBee wireless communication module.

In an embodiment, the sensing type lighting device further includes a music player, a safety monitoring device, a voice-controlled switch and/or a light-controlled switch. The music player, the safety monitoring device, the voice-controlled switch and/or the light-controlled switch is disposed on the lighting main body and electrically connected with the controlling circuit.

In an embodiment, the sensing type lighting device is an outdoor sensing type lighting device, and the outdoor sensing type lighting device further includes a solar battery. The solar battery is electrically connected with the controlling circuit.

In accordance with another aspect of the present invention, there is provided a sensing type lighting group. The sensing type lighting group includes a first lighting device and a second lighting device. The first lighting device at least includes a first light source set, a first sensing element, a first electromagnetic wireless communication module and a first controlling circuit. The first controlling circuit is electrically connected with the first light source set, the first sensing element and the first electromagnetic wireless communication module. The second lighting device at least includes a second light source set, a second electromagnetic wireless communication module and a second controlling circuit. The second controlling circuit is electrically connected with the second light source set and the second electromagnetic wireless communication module. According to an environmental sensing result of the first sensing element, a communication channel between the first electromagnetic wireless communication module and the second electromagnetic wireless communication module is established, so that a light intensity of the first light source set and/or the second light source set is correspondingly controlled.

In an embodiment, the first lighting device at least includes a master control function, and the second lighting device at least includes a controlled function. According to the environmental sensing result, the light intensity of the first light source set is actively controlled by the first lighting device, and the light intensity of the second light source set of the second lighting device is controlled in response to a control command from the first lighting device.

In an embodiment, the second lighting device further includes a second sensing element for receiving the environmental sensing result. The communication channel between the first electromagnetic wireless communication module and the second electromagnetic wireless communication module is established according to the environmental sensing result, so that the light intensity of the first light source set and/or the second light source set is correspondingly controlled.

In an embodiment, each of the first lighting device and the second lighting device has both of the master control function and a controlled function. When a lighting control program is automatically executed by the first lighting device and the second lighting device, the light intensity of the first light source set and/or the second light source set is correspondingly controlled.

In an embodiment, each of the first sensing element and the second sensing element is a passive infrared human body sensor or a microwave sensor.

In an embodiment, each of the first lighting device and the second lighting device is at least selected from one of a sensing type LED light bulb, a sensing type LED light tube, a sensing type lamp and a sensing type work lamp. The sensing type lamp is at least selected from a sensing type ceiling lamp or a sensing type garden lamp, and the sensing type work lamp is at least selected from a sensing type work lamp with a spraying function or a sensing type work lamp with a humidifying function.

In an embodiment, each of the first electromagnetic wireless communication module and the second electromagnetic wireless communication module is operated in a frequency band of an invisible light spectrum. Each of the first electromagnetic wireless communication module and the second electromagnetic wireless communication module is at least selected from one of a 313.325 MHz wireless communication module, a 433 MHz wireless communication module, a 418 MHz wireless communication module, a 2.4 GHz wireless communication module, a 5.8 GHz wireless communication module, a 10 GHz wireless communication module, a Bluetooth wireless communication module, a Wi-Fi wireless communication module, a NFC wireless communication module, a Z-Wave wireless communication module and a ZigBee wireless communication module.

In an embodiment, at least one of the first lighting device and the second lighting device further includes at least one of a music player, a safety monitoring device, a voice-controlled switch, a light-controlled switch and/or a solar battery.

In accordance with a further aspect of the present invention, there is provided a controlling method for a sensing type lighting group. The controlling method at least includes the following steps. Firstly, a first lighting device is provided. The first lighting device at least includes a first light source set, a first sensing element, a first electromagnetic wireless communication module and a first controlling circuit. The first controlling circuit is electrically connected with the first light source set, the first sensing element and the first electromagnetic wireless communication module. Then, a second lighting device is provided. The second lighting device at least includes a second light source set, a second electromagnetic wireless communication module and a second controlling circuit. The second controlling circuit is electrically connected with the second light source set and the second electromagnetic wireless communication module. Afterwards, a communication channel between the first electromagnetic wireless communication module and the second electromagnetic wireless communication module is established according to an environmental sensing result of the first sensing element, so that a light intensity of the first light source set and/or the second light source set is correspondingly controlled.

In an embodiment, the first lighting device at least includes a master control function, and the second lighting device at least includes a controlled function. According to the environmental sensing result, the light intensity of the first light source set is actively controlled by the first lighting device, and the light intensity of the second light source set of the second lighting device is controlled in response to a control command from the first lighting device.

In an embodiment, the second lighting device further includes a second sensing element for receiving the environmental sensing result. The communication channel between the first electromagnetic wireless communication module and the second electromagnetic wireless communication module is established according to the environmental sensing result, so that the light intensity of the first light source set and/or the second light source set is correspondingly controlled.

In an embodiment, each of the first lighting device and the second lighting device has both of the master control function and a controlled function. When a lighting control program is automatically executed by the first lighting device and the second lighting device, the light intensity of the first light source set and/or the second light source set is correspondingly controlled.

In an embodiment, each of the first sensing element and the second sensing element is a passive infrared human body sensor or a microwave sensor.

In an embodiment, each of the first lighting device and the second lighting device is at least selected from one of a sensing type LED light bulb, a sensing type LED light tube, a sensing type lamp and a sensing type work lamp. The sensing type lamp is at least selected from a sensing type ceiling lamp or a sensing type garden lamp. The sensing type work lamp is at least selected from a sensing type work lamp with a spraying function or a sensing type work lamp with a humidifying function.

In an embodiment, each of the first electromagnetic wireless communication module and the second electromagnetic wireless communication module is operated in a frequency band of an invisible light spectrum. Each of the first electromagnetic wireless communication module and the second electromagnetic wireless communication module is at least selected from one of a 313.325 MHz wireless communication module, a 433 MHz wireless communication module, a 418 MHz wireless communication module, a 2.4 GHz wireless communication module, a 5.8 GHz wireless communication module, a 10 GHz wireless communication module, a Bluetooth wireless communication module, a Wi-Fi wireless communication module, a NFC wireless communication module, a Z-Wave wireless communication module and a ZigBee wireless communication module.

In an embodiment, at least one of the first lighting device and the second lighting device further includes at least one of a music player, a safety monitoring device, a voice-controlled switch, a light-controlled switch and/or a solar battery.

The design of the present invention and the arrangement of the group control mechanism can obviously reduce the cost of initial installation of the sensing type lighting device. Consequently, the sensing type lighting device of the present invention can be widely adopted. Moreover, when the sensing type lighting device of the present invention and another sensing type lighting device cooperate, the lighting interference or inconsistence between these two lighting devices or other adverse factors are eliminated. Moreover, by the controlling method of the present invention, it is easy to elaborately control and equilibrate the lighting effects of plural sensing type lighting devices within the same space. Moreover, if a sensing type lighting device is expected to provide an additional control function and further cooperated the additional control function that is integrated with the electromagnetic wireless communication function (e.g. a music playing function or a safety monitoring function or a voice control function), the present invention can implement the group control mechanism in a cost-effective manner. In other words, the present invention has industrial applicability.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
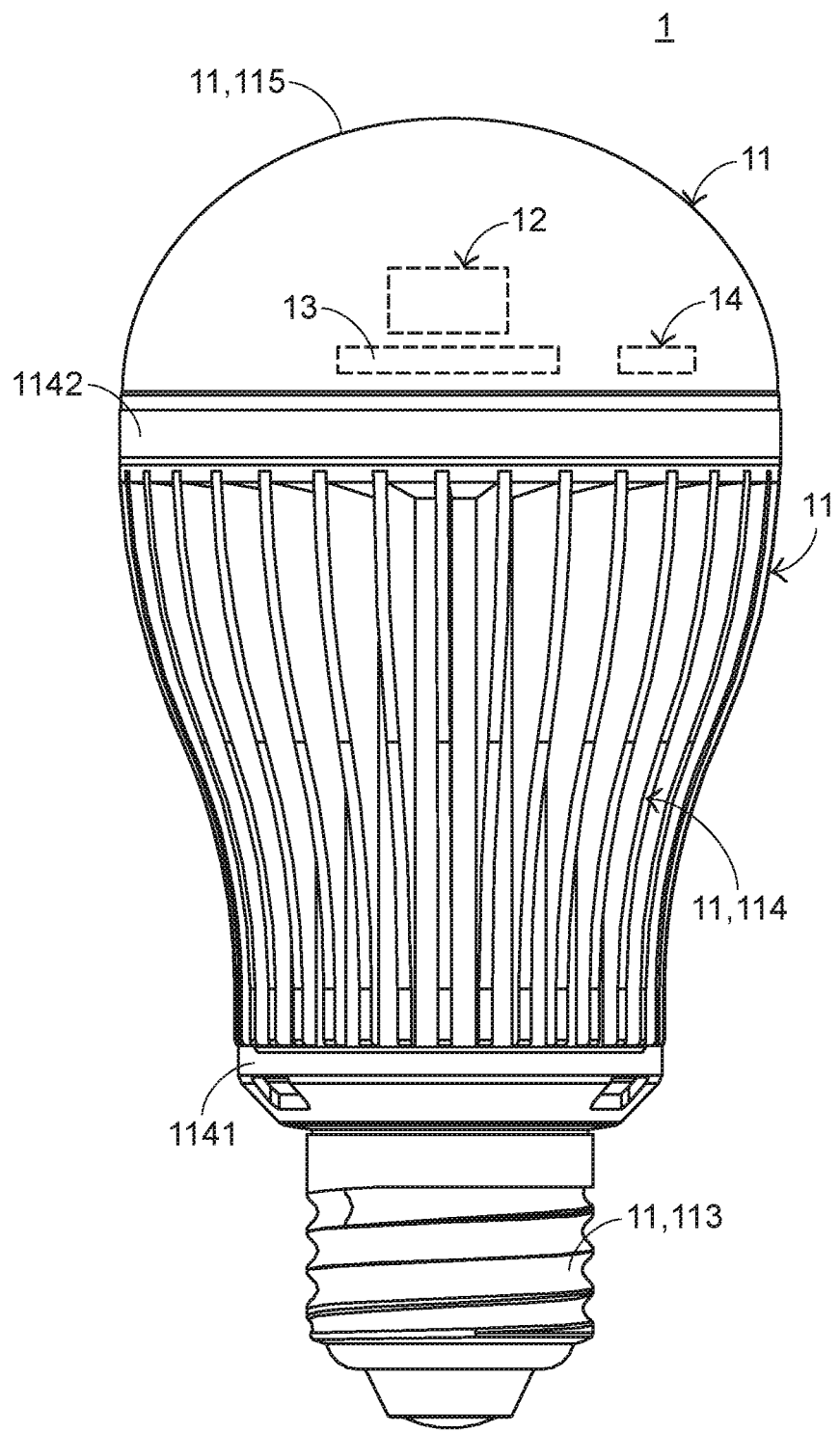
FIG. 1 is a schematic perspective view illustrating a microwave sensing type LED light bulb with a microwave sensor and an electromagnetic wireless communication module according to an embodiment of the present invention.

For enhancing the automatic lighting control efficacy and increasing the diversified use or control applications, the present invention provides a sensing type lighting device with an additional receiving/transmitting module for performing wireless communication and strengthening the wireless control function of the sensing type lighting device or a sensing type lighting group.

Moreover, the wireless communication module used in the sensing type lighting device of the present invention is an electromagnetic wireless communication module that is operated in a frequency band of an invisible light spectrum. The electromagnetic wireless communication module is at least selected from one of a 313.325 MHz wireless communication module, a 433 MHz wireless communication module, a 418 MHz wireless communication module, a 2.4 GHz wireless communication module, a 5.8 GHz wireless communication module, a 10 GHz wireless communication module, a Bluetooth wireless communication module, a Wi-Fi wireless communication module, a near field communication (NFC) wireless communication module, a Z-Wave wireless communication module and a ZigBee wireless communication module, but is not limited thereto.

Moreover, the sensing element used in the sensing type lighting device of the present invention is a passive infrared human body sensor (PIR) or a microwave sensor, but is not limited thereto. For example, the sensing element may be a sensing device using a special optical wave to perform an optical sensing control operation by sensing whether a human body moves or an objected is moved.

In case that the sensing type lighting device of the present invention is a light bulb or a light tube, the light source set is a LED light source set comprising one or more LED chips. These LED chips may have identical color temperature or luminance or chroma; or the color temperature or luminance or chroma of at least a portion of the LED chips may be different from the color temperature or luminance or chroma of another portion of the LED chips. Moreover, the sensing element for the light bulb or the light tube is directly combined with the lighting main body of the light bulb or the light tube, which will be described in more details later. That is, the sensing element is not separated or detached from the lighting main body of the light bulb or the light tube.

In case that the sensing type lighting device of the present invention is one of a sensing type lamp and a sensing type work lamp, the sensing type lamp is at least selected from a sensing type ceiling lamp or a sensing type garden lamp, and the sensing type work lamp is at least selected from a sensing type work lamp with a spraying function or a sensing type work lamp with a humidifying function, but is not limited thereto.

The light source set used in the sensing type lamp or the sensing type work lamp is a LED light source set comprising plural LED chips. Alternatively, the light source set used in the sensing type lamp or the sensing type work lamp is an incandescent light source set or a fluorescent light source set. Of course, the plural LED chips of the LED light source set may have identical color temperature or luminance or chroma; or the color temperature or luminance or chroma of at least a portion of the LED chips may be different from the color temperature or luminance or chroma of another portion of the LED chips.

Moreover, the sensing element for the sensing type lamp or the sensing type work lamp is for example a passive infrared human body sensor (PIR) or a microwave sensor. The sensing element may be directly combined with the lighting main body of the light bulb or the light tube of the sensing type lamp or the sensing type work lamp. Alternatively, the sensing element is detached or separated from the light source (e.g. the light bulb or the light tube) of the sensing type lamp or the sensing type work lamp, but the sensing element is still combined with the lighting main body of the light bulb or the light tube of the sensing type lamp or the sensing type work lamp.

Moreover, the sensing type lighting device of the present invention further at least comprises a music player, a safety monitoring device, a voice-controlled switch and/or a light-controlled switch. The music player, the safety monitoring device, the voice-controlled switch and/or the light-controlled switch is disposed on the lighting main body of the sensing type lighting device and electrically connected with a controlling circuit.

For example, the music player integrated into the sensing type lighting device of the present invention is a music player with a built-in function of automatically playing music. Alternatively, the music player may be further integrated with the above-mentioned electromagnetic wireless communication module for receiving an audio signal from a user-operated portable electronic device (e.g. iPhone or iPad) or any other sound playing device and synchronously playing music. Moreover, if the chroma of a portion of the LED chips of the LED light source set and the chroma of another portion of the LED chips are different, the changes of lighting effects are controlled according to the rhythm of the music.

As for the safety monitoring device, a surveillance monitoring device and the above-mentioned electromagnetic wireless communication module may be integrated into the sensing type lighting device of the present invention. Consequently, according to the result of judging the monitored image, a control command is issued to control strong illumination of a large area of a specified detection region.

Moreover, the light-controlled switch and the above-mentioned electromagnetic wireless communication module may be integrated into the sensing type lighting device of the present invention. Consequently, the efficacy of adjusting the light intensity of the sub-regions within the lighting space can be adjusted in a more balance and elaborate manner.

Moreover, a voice-controlled switch and the above-mentioned electromagnetic wireless communication module may be integrated into the sensing type lighting device of the present invention. Consequently, according to the voice-controlled result of the voice-controlled switch, a control command is issued to perform lighting control or other wireless communication control.

Moreover, in case that the sensing type lighting device is an outdoor sensing type lighting device, the sensing type lighting device further at least comprises a solar battery. The solar battery is used as a backup power source. The solar battery may be electrically connected with the above controlling circuit.

Hereinafter, various sensing type LED light devices of the present invention will be illustrated by referring to the above descriptions.

Figure 2:
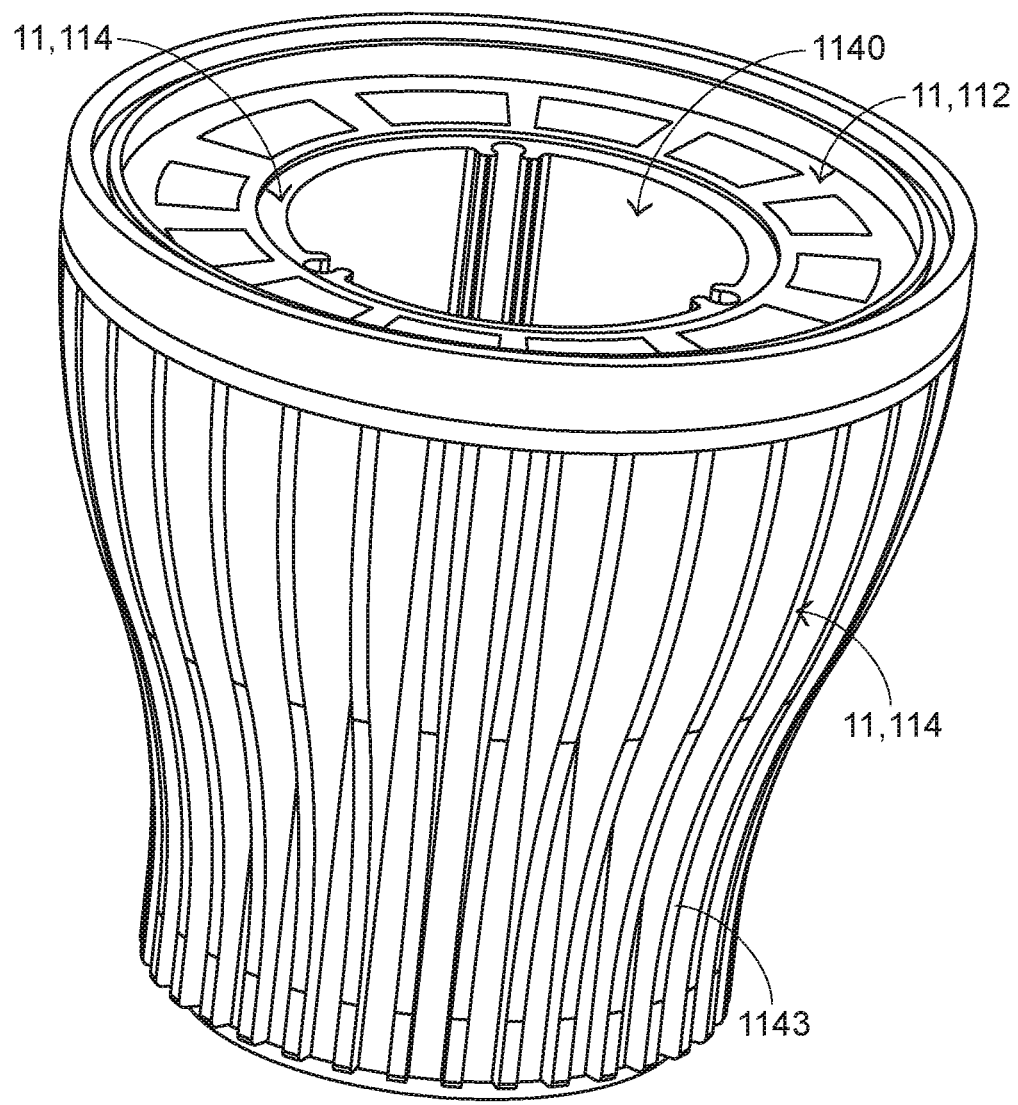
FIG. 2 is a schematic perspective view illustrating the combination of a LED light source set and a bulb casing of the microwave sensing type LED light bulb of FIG. 1.
Figure 3:
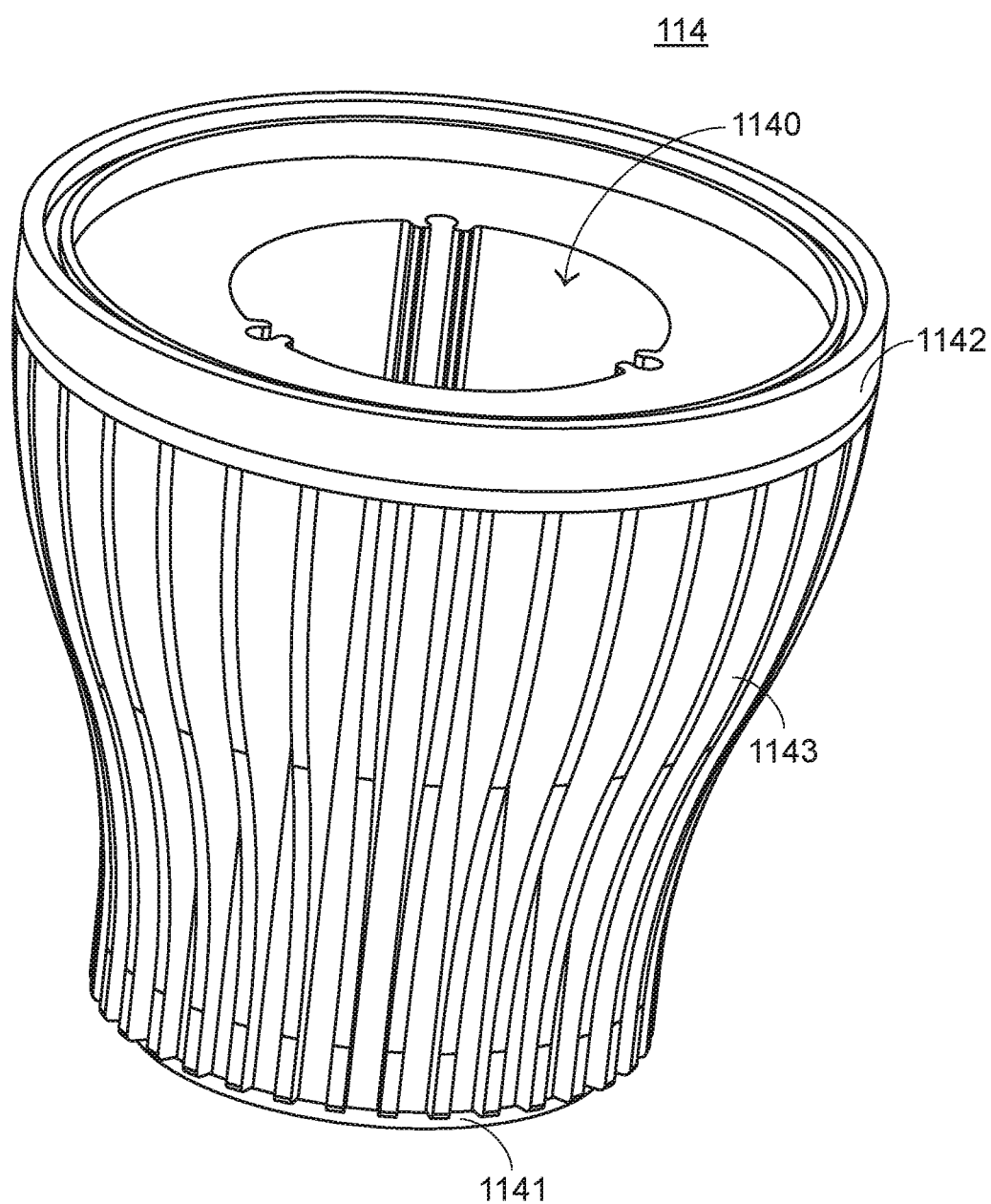
FIG. 3 is a schematic perspective view illustrating the bulb casing of the microwave sensing type LED light bulb of FIG. 1.
Figure 4:
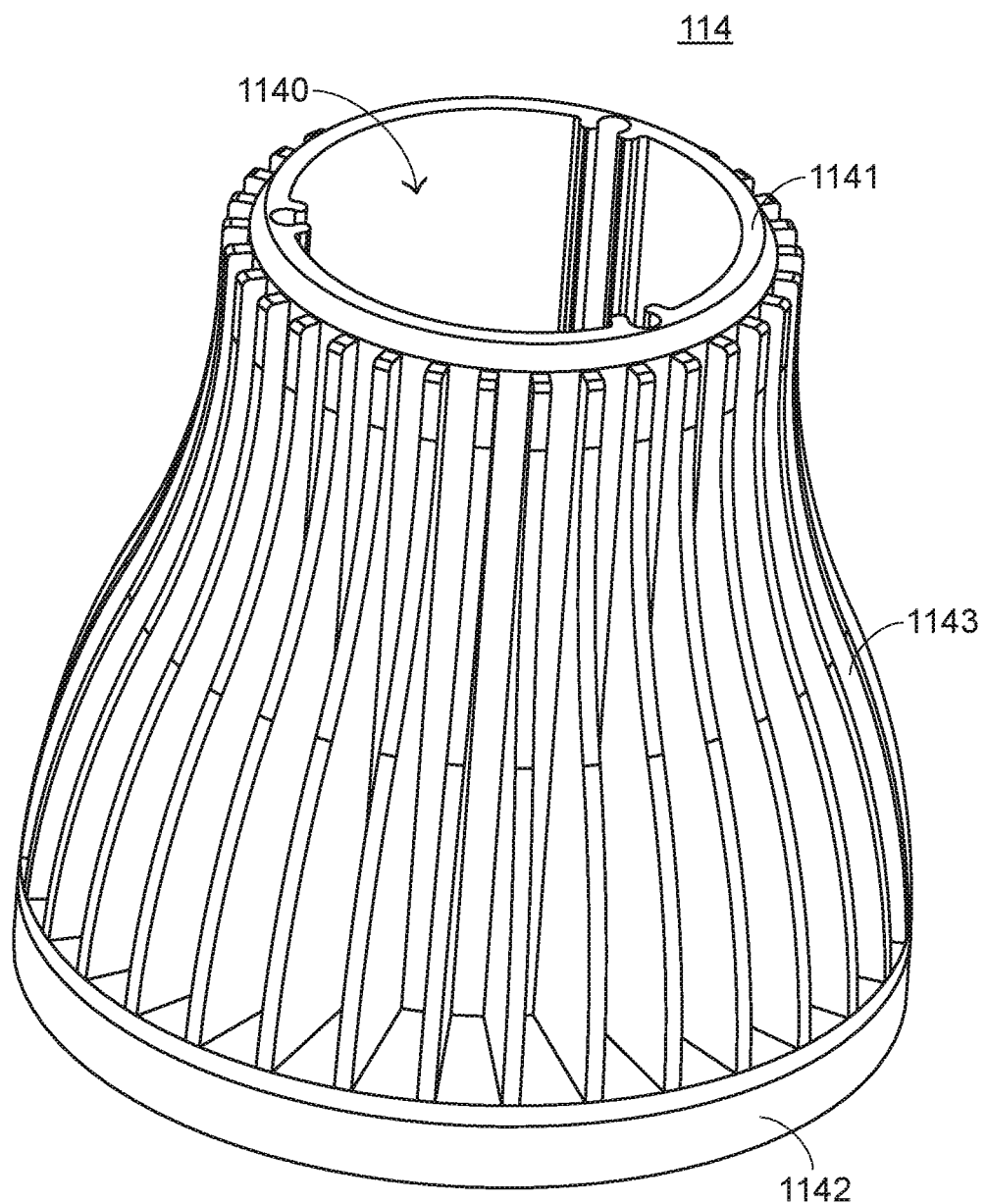
FIG. 4 is a schematic perspective view illustrating the bulb casing of the microwave sensing type LED light bulb of FIG. 1 and taken along another viewpoint.
Figure 5:
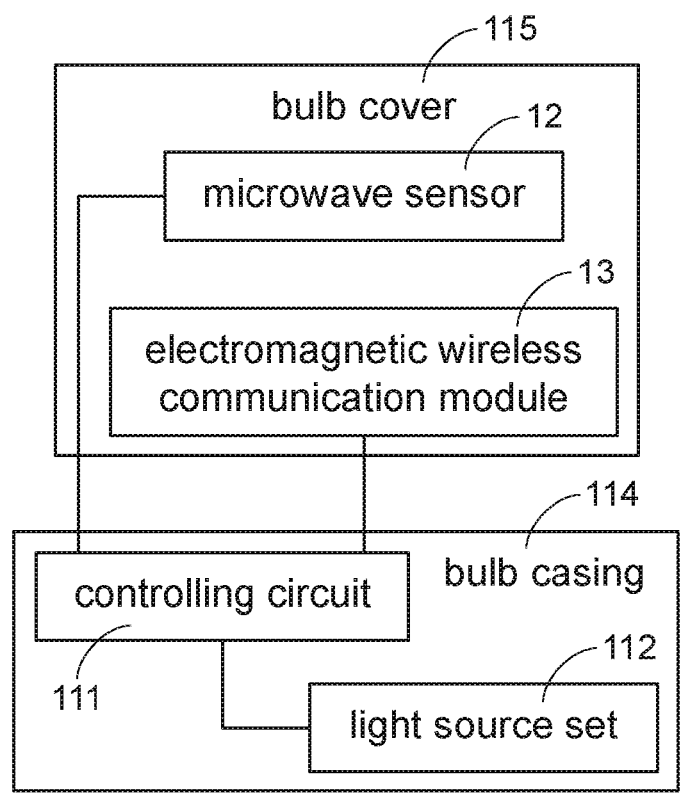
FIG. 5 is a schematic perspective view illustrating a controlling circuit of the microwave sensing type LED light bulb of FIG. 1.
Figure 6:
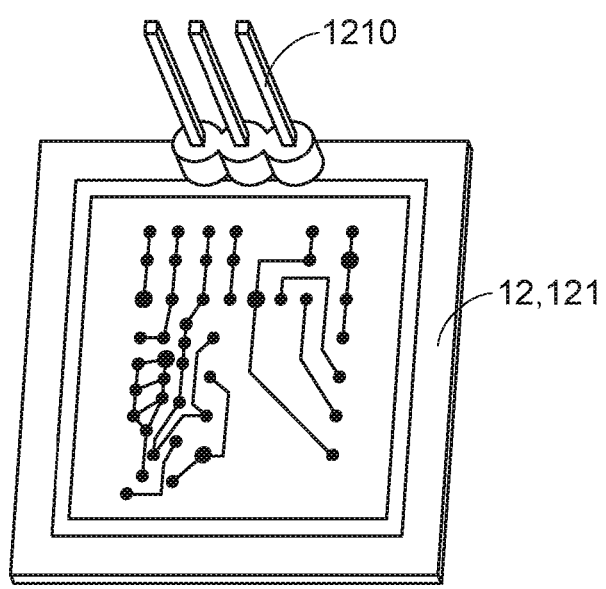
FIG. 6 is a schematic perspective view illustrating a portion of a sensing circuit of a microwave sensor of the microwave sensing type LED light bulb of FIG. 1.

Please refer to FIGS. 1~6. FIG. 1 is a schematic perspective view illustrating a microwave sensing type LED light bulb with a microwave sensor and an electromagnetic wireless communication module according to an embodiment of the present invention. FIG. 2 is a schematic perspective view illustrating the combination of a LED light source set and a bulb casing of the microwave sensing type LED light bulb of FIG. 1. FIG. 3 is a schematic perspective view illustrating the bulb casing of the microwave sensing type LED light bulb of FIG. 1. FIG. 4 is a schematic perspective view illustrating the bulb casing of the microwave sensing type LED light bulb of FIG. 1 and taken along another viewpoint. FIG. 5 is a schematic perspective view illustrating a controlling circuit of the microwave sensing type LED light bulb of FIG. 1. FIG. 6 is a schematic perspective view illustrating a portion of a sensing circuit of a microwave sensor of the microwave sensing type LED light bulb of FIG. 1.

The microwave sensing type LED light bulb 1 comprises a bulb main body 11, a microwave sensor 12, and an electromagnetic wireless communication module 13. The bulb main body 11 is used as a lighting main body. Moreover, the bulb main body 11 at least comprises a controlling circuit 111 and a LED light source set 112. The LED light source set 112 is electrically connected with the controlling circuit 111. The microwave sensor 12 is disposed within the bulb main body 11. In addition, the microwave sensor 12 is electrically connected with the controlling circuit 111. The electromagnetic wireless communication module 13 is disposed within the bulb main body 11. In addition, the electromagnetic wireless communication module 13 is electrically connected with the controlling circuit 111. Through the electromagnetic wireless communication module 13, a group control mechanism between the microwave sensing type LED light bulb 1 and other lighting devices (e.g. sensing type lighting devices or non-sensing type lighting device) may be established or a wireless communication control mechanism of controlling other additional functions may be established.

Moreover, the bulb main body 11 further at least comprises a male connector 113, a bulb casing 114, and a bulb cover 115. The male connector 113 is located at a first end 1141 of the bulb casing 114. The LED light source set 112 and the bulb cover 115 are both disposed within the bulb casing 114 and located at a second end 1142 of the bulb casing 114, wherein the second end 1142 and the first end 1141 are opposed to each other. Moreover, the LED light source set 112 is covered by the bulb cover 115.

In this embodiment, the bulb casing 114 is a heat-dissipating structure. The heat-dissipating structure 114 has an accommodation part 1140. The accommodation part 1140 is in communication with the first end 1141 and the second end 1142. At least some electronic components of the controlling circuit 111 are accommodated within the accommodation part 1140. Moreover, plural fins 1143 are disposed on an outer surface of the heat-dissipating structure 114. Preferably, the heat-dissipating structure 114 is made of aluminum alloy or other metal alloy. Alternatively, the heat-dissipating structure 114 is made of any other material with heat-dissipating capability, for example a porous ceramic material. Moreover, due to the accommodation part 1140 and/or the fins 1143, the heat generated by the LED light source set 112 can be quickly dissipated away.

Moreover, the bulb cover 115 is at least selected from one of a square cover, a cylindrical cover and a spherical cover, but is not limited thereto.

The implementation example of the microwave sensor 12 is described in FIG. 6. As shown in FIG. 6, a microwave receiving circuit 121 of the microwave sensor 12 comprises a receiving/transmitting antenna 1210. Those skilled in the art will readily observe that a microwave can be successfully transferred through the bulb cover 115. Consequently, the microwave sensor 12 can sense the movement of an object.

Optionally, the microwave sensing type LED light bulb 1 may further comprise an additional electronic device 14. For example, the additional electronic device 14 is a music player, a safety monitoring device, a voice-controlled switch and/or a light-controlled switch.

Figure 7:
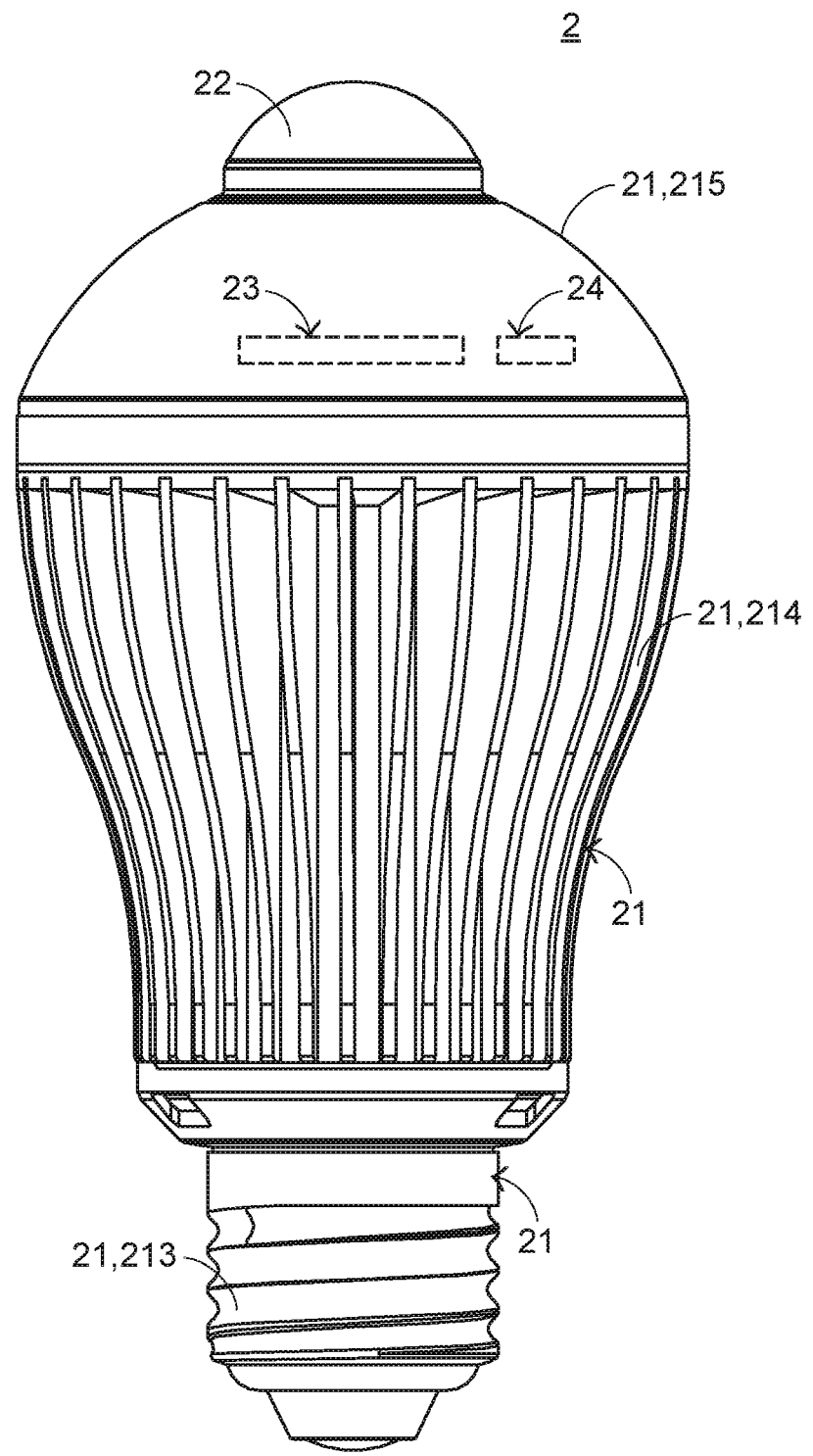
FIG. 7 is a schematic perspective view illustrating a PIR sensing type LED light bulb with a PIR sensor and an electromagnetic wireless communication module according to an embodiment of the present invention.

FIG. 7 is a schematic perspective view illustrating a PIR sensing type LED light bulb with a PIR sensor and an electromagnetic wireless communication module according to an embodiment of the present invention. The PIR sensing type LED light bulb 2 comprises a bulb main body 21, a PIR sensor 22, and an electromagnetic wireless communication module 23. Moreover, the bulb main body 21 further at least comprises a male connector 213, a bulb casing 214, a bulb cover 215, and a controlling circuit (not shown). The controlling circuit within the bulb main body 21 is similar to the controlling circuit 111 of FIG. 1. However, since the controlling circuit within the bulb main body 21 is electrically connected with the PIR sensor 22, the circuitry of the controlling circuit of this embodiment is somewhat different from that of the controlling circuit 111 of FIG. 1. The circuitry of the controlling circuit of this embodiment is well know to those skilled in the art, and is not redundantly described herein.

Moreover, the bulb main body 21 further comprises a LED light source set (not shown). The functions or structures of the LED light source set, the male connector 213, the bulb casing 214 and the electromagnetic wireless communication module 23 are similar to those of the corresponding components of FIG. 1, and are not redundantly described herein.

In comparison with the bulb cover 115 of FIG. 1, the PIR sensor 22 is not shielded by the bulb cover 215. That is, since the PIR sensor 22 is protruded outside the bulb cover 215, the sensing function of the PIR sensor 22 is achievable.

Optionally, the PIR sensing type LED light bulb 2 may further comprise an additional electronic device 24. For example, the additional electronic device 24 is a music player, a safety monitoring device, a voice-controlled switch and/or a light-controlled switch.

Figure 8:
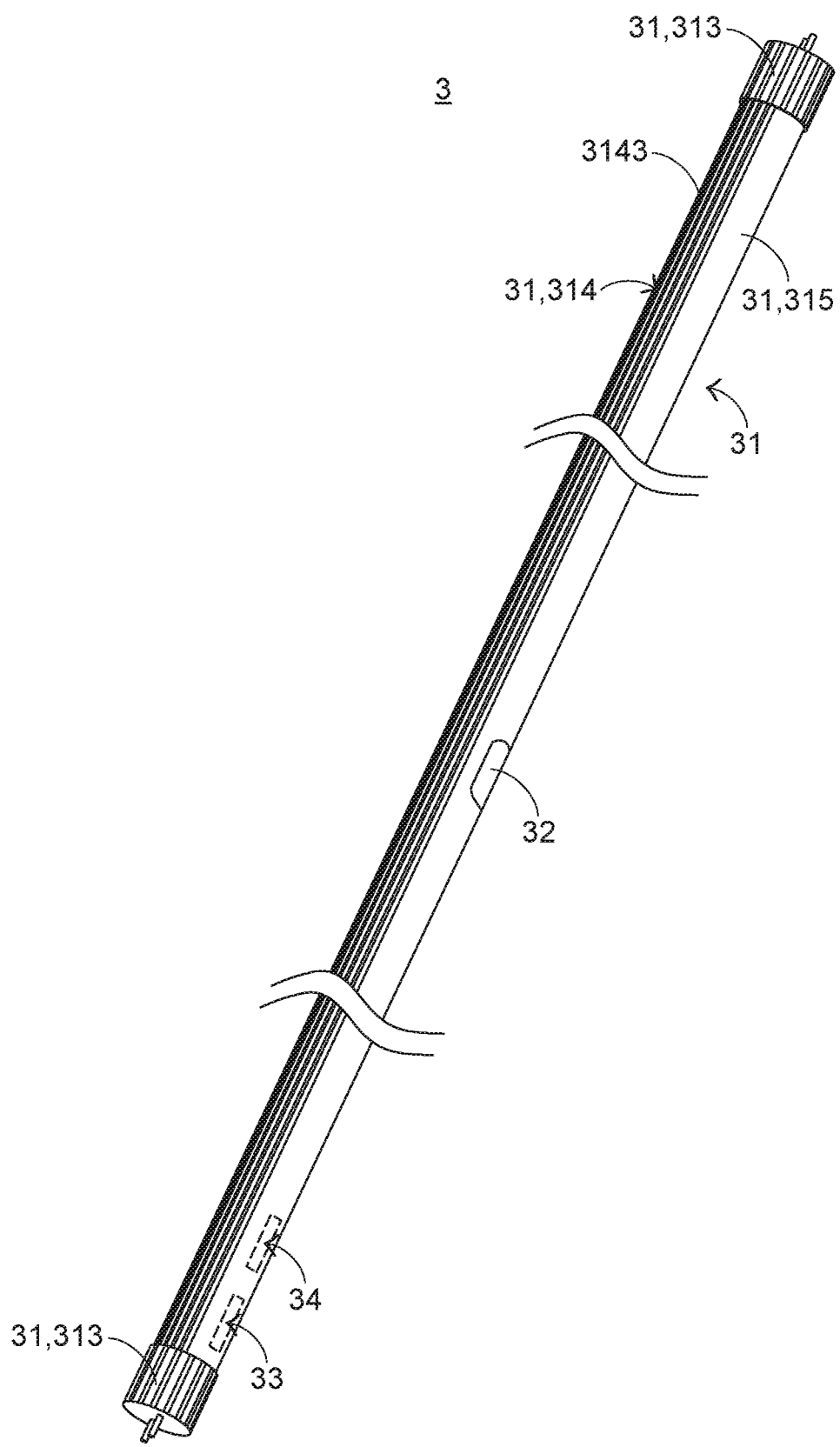
FIG. 8 is a schematic perspective view illustrating a microwave sensing type LED light tube with a microwave sensor and an electromagnetic wireless communication module according to an embodiment of the present invention.

FIG. 8 is a schematic perspective view illustrating a microwave sensing type LED light tube with a microwave sensor and an electromagnetic wireless communication module according to an embodiment of the present invention. The microwave sensing type LED light tube 3 comprises a tube main body 31, a microwave sensor 32, and an electromagnetic wireless communication module 33. The tube main body 31 is used as a lighting main body. The tube main body 31 at least comprises two tube caps 313, a tube casing 314, a tube cover 315 and a controlling circuit (not shown). The controlling circuit within the tube main body 31 is similar to the controlling circuit 111 of FIG. 1, and is not redundantly described herein.

Moreover, the tube main body 31 further comprises a strip-shaped LED light source set (not shown). The functions or structures of the strip-shaped LED light source set, the two tube caps 313 and the electromagnetic wireless communication module 33 are similar to those of the corresponding components of FIG. 1, and are not redundantly described herein.

Moreover, in this embodiment, the tube casing 314 is a non-closed-circular tube casing (or a non-closed-circular heat-dissipating structure). Moreover, plural fins 3143 are disposed on an outer surface of the non-closed-circular heat-dissipating structure 314. The two tube caps 313 are located at two ends of the non-closed-circular heat-dissipating structure 314, respectively. The strip-shaped LED light source set and the tube cover 315 are both connected to an entrance of the non-closed-circular tube heat-dissipating structure 314. Consequently, the strip-shaped LED light source set, the tube cover 315 and the non-closed-circular tube heat-dissipating structure 314 are combined as a closed circular tube main body. Moreover, the tube cover 315 is a PVC tube cover, but is not limited thereto.

Preferably, the tube casing 314 is a non-closed tube casing. For example, the tube casing 314 is a non-closed-circular tube casing, a non-closed-near-circular tube casing, a non-closed-elliptic tube casing or a non-closed arc-shaped tube casing, but is not limited thereto. Alternatively, the tube casing 314 may be a non-closed tube casing with a shape of one-half circle or a non-closed tube casing with a shape of three-fourth circle, but is not limited thereto.

Optionally, the microwave sensing type LED light tube 3 may further comprise an additional electronic device 34. For example, the additional electronic device 34 is a music player, a safety monitoring device, a voice-controlled switch and/or a light-controlled switch.

Figure 9:
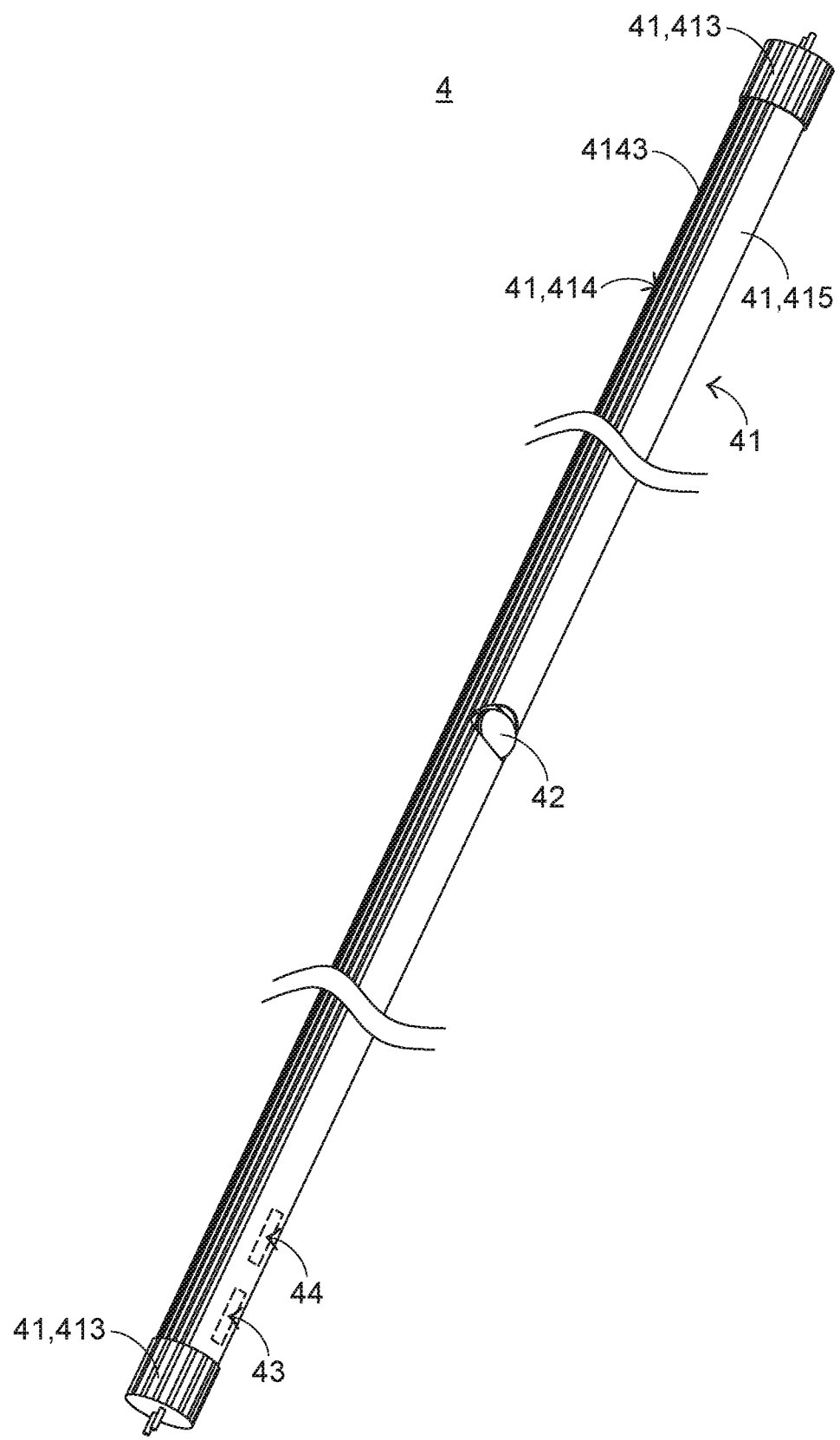
FIG. 9 is a schematic perspective view illustrating a PIR sensing type LED light tube with a PIR sensor and an electromagnetic wireless communication module according to an embodiment of the present invention.

FIG. 9 is a schematic perspective view illustrating a PIR sensing type LED light tube with a PIR sensor and an electromagnetic wireless communication module according to an embodiment of the present invention. The PIR sensing type LED light tube 4 comprises a tube main body 41, a PIR sensor 42, and an electromagnetic wireless communication module 43. The tube main body 41 is used as a lighting main body. The tube main body 41 at least comprises two tube caps 413, a tube casing 414, a tube cover 415 and a controlling circuit (not shown).

The PIR sensor 42 and the controlling circuit within the tube main body 41 are similar to the PIR sensor 22 and the controlling circuit of FIG. 7, and are not redundantly described herein.

Moreover, the tube main body 41 further comprises a strip-shaped LED light source set (not shown). The functions or structures of the strip-shaped LED light source set, the two tube caps 413, the tube casing 414, the tube cover 415 and the electromagnetic wireless communication module 43 are similar to those of the corresponding components of FIG. 8, and are not redundantly described herein.

Optionally, the PIR sensing type LED light tube 4 may further comprise an additional electronic device 44. For example, the additional electronic device 44 is a music player, a safety monitoring device, a voice-controlled switch and/or a light-controlled switch.

Figure 10:
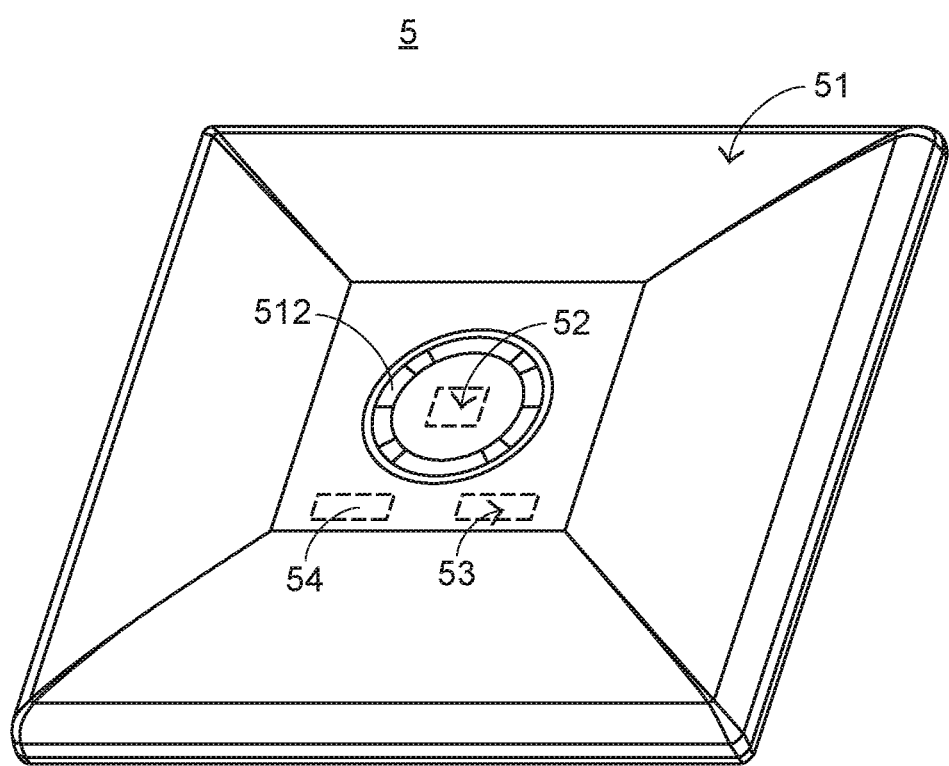
FIG. 10 is a schematic perspective view illustrating a microwave sensing type ceiling lamp with a microwave sensor and an electromagnetic wireless communication module according to an embodiment of the present invention.

FIG. 10 is a schematic perspective view illustrating a microwave sensing type ceiling lamp with a microwave sensor and an electromagnetic wireless communication module according to an embodiment of the present invention. The microwave sensing type ceiling lamp 5 comprises a ceiling lamp main body 51, a microwave sensor 52, and an electromagnetic wireless communication module 53. The ceiling lamp main body 51 is used as a lighting main body. The ceiling lamp main body 51 at least comprises a controlling circuit (not shown) and an annular LED light source set 512. The microwave sensor 52 is disposed within the ceiling lamp main body 51.

Optionally, the microwave sensing type ceiling lamp 5 may further comprise an additional electronic device 54. For example, the additional electronic device 54 is a music player, a safety monitoring device, a voice-controlled switch and/or a light-controlled switch.

Figure 11:
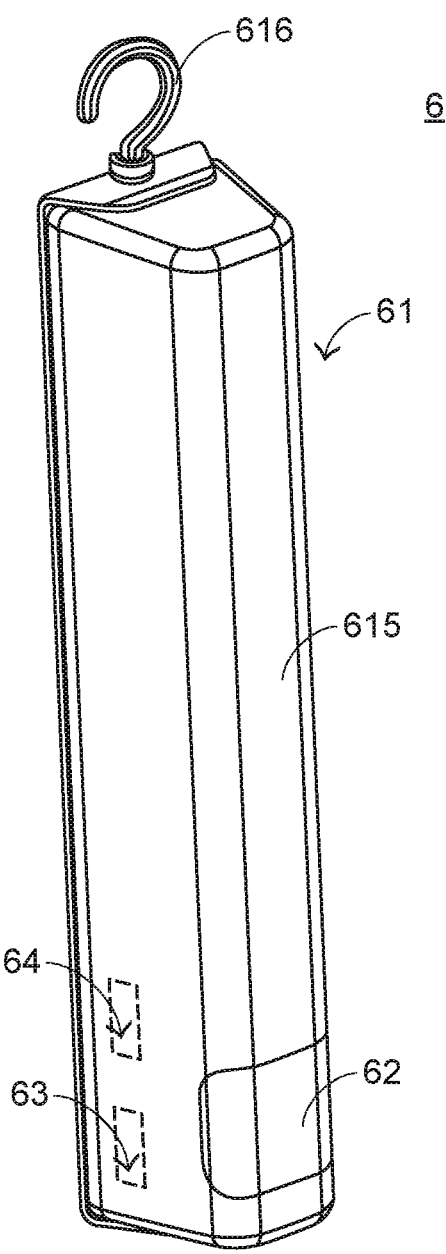
FIG. 11 is a schematic perspective view illustrating a microwave sensing type work lamp with a microwave sensor and an electromagnetic wireless communication module according to an embodiment of the present invention.

FIG. 11 is a schematic perspective view illustrating a microwave sensing type work lamp with a microwave sensor and an electromagnetic wireless communication module according to an embodiment of the present invention. The microwave sensing type work lamp 6 (e.g. a microwave sensing type work lamp with a spraying function or a humidifying function) comprises a work lamp main body 61, a microwave sensor 62, and an electromagnetic wireless communication module 63. The work lamp main body 61 is used as a lighting main body. The work lamp main body 61 at least comprises a lamp cover 615, a rotatable hook 616, a controlling circuit (not shown) and a LED light source set (not shown). The microwave sensor 62 is disposed within the work lamp main body 61.

Optionally, the microwave sensing type work lamp 6 may further comprise an additional electronic device 64. For example, the additional electronic device 64 is a music player, a safety monitoring device, a voice-controlled switch and/or a light-controlled switch.

Figure 12:
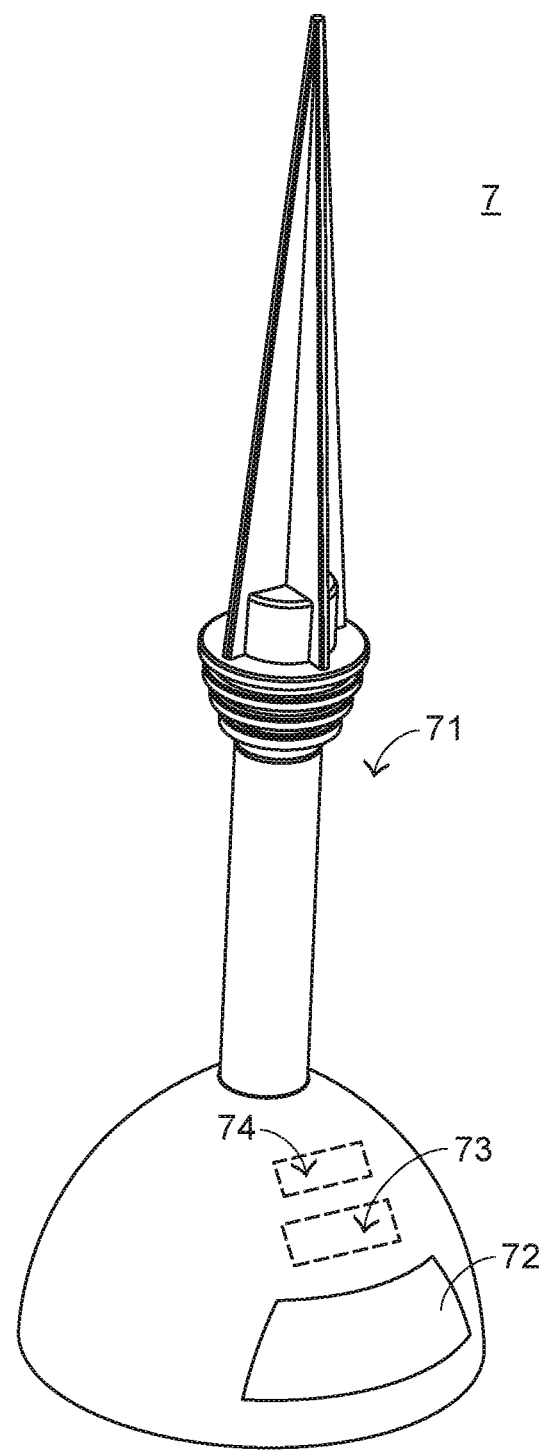
FIG. 12 is a schematic perspective view illustrating a microwave sensing type garden lamp with a microwave sensor and an electromagnetic wireless communication module according to an embodiment of the present invention.

FIG. 12 is a schematic perspective view illustrating a microwave sensing type garden lamp with a microwave sensor and an electromagnetic wireless communication module according to an embodiment of the present invention. The microwave sensing type garden lamp 7 comprises a garden lamp main body 71, a microwave sensor 72, and an electromagnetic wireless communication module 73. The garden lamp main body 71 is used as a lighting main body. The garden lamp main body 71 at least comprises a controlling circuit (not shown) and a LED light source set (not shown). The microwave sensor 72 is disposed within the garden lamp main body 71.

Optionally, the microwave sensing type garden lamp 7 may further comprise an additional electronic device 74. For example, the additional electronic device 74 is a music player, a safety monitoring device, a voice-controlled switch and/or a light-controlled switch.

Hereinafter, some implementation examples of a sensing type lighting group including plural above-mentioned sensing type lighting devices will be illustrated.

Figure 13:
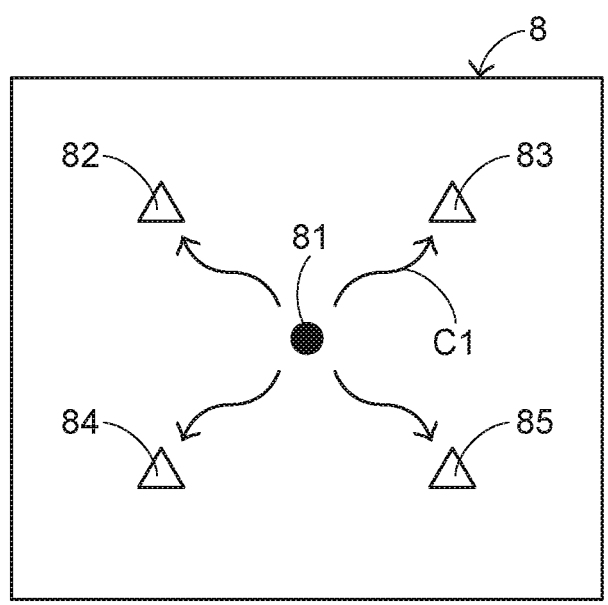
FIG. 13 schematically illustrates a group control mechanism of a sensing type lighting group including plural sensing type lighting devices according to a first embodiment of the present invention.

FIG. 13 schematically illustrates a group control mechanism of a sensing type lighting group including plural sensing type lighting devices according to a first embodiment of the present invention. As shown in FIG. 13, five lighting devices 81~85 are located within a detection space 8. The lighting device 81 is a sensing type lighting device with a sensing element and an electromagnetic wireless communication module. In addition, the sensing type lighting device 81 at least has a master control function.

Each of the lighting devices 82~85 is a non-sensing type lighting device (e.g. an ordinary lighting device) with an electromagnetic wireless communication module. In addition, each of the lighting devices 82~85 only has a controlled function. That is, each of the lighting devices 82~85 can only be passively controlled in response to a wireless lighting control, but each of the lighting devices 82~85 cannot actively issue a control command (e.g. a lighting control command) to other lighting devices.

According to an environmental sensing result, the sensing type lighting device 81 actively controls the light intensity of the light source set of the sensing type lighting device 81 itself, and simultaneously issues a lighting control command C1 in an electromagnetic wireless communication manner. According to the lighting control command C1, the light intensity of each light source set of the lighting devices 82~85 are correspondingly controlled.

The above group control mechanism has at least one benefit. For example, in the same space, only one sensing type lighting device has higher cost, but the other sensing type lighting devices have lower cost. Under this circumstance, the optimal lighting balance control of the whole space is achieved. Due to the above group control mechanism, the initial installation cost of the sensing type lighting device is largely reduced.

It is noted that the lighting control command C1 is presented herein for purpose of illustration and description only. That is, the sensing type lighting device 81 may issue other control commands to execute other additional functions that are mentioned above.

Figure 14:
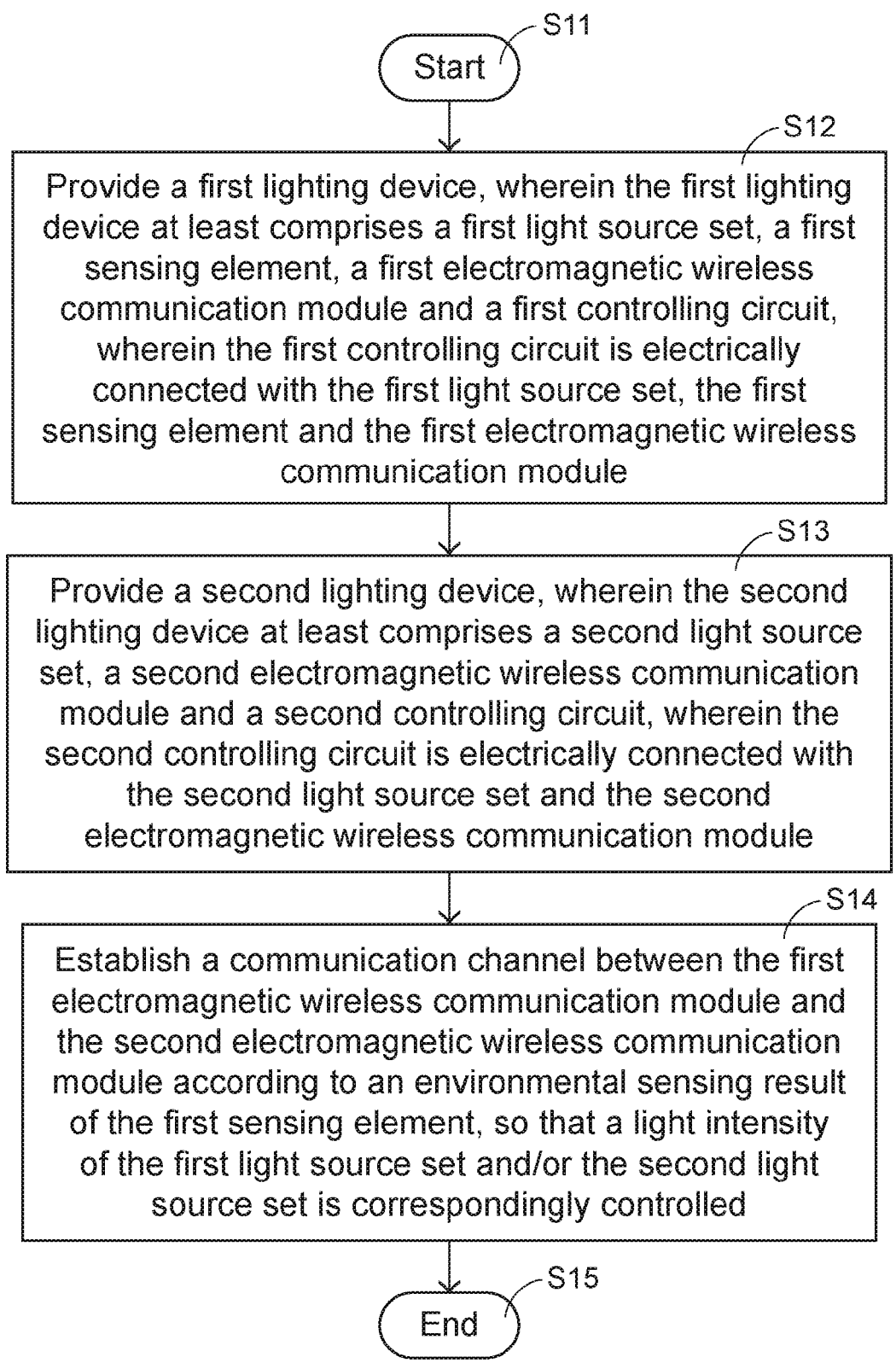
FIG. 14 is a flowchart illustrating a method of performing the group control mechanism according to the first embodiment of the present invention.

A flowchart of a method of performing the group control mechanism according to the first embodiment of the present invention will be described with reference to FIG. 14.

The method of performing the group control mechanism according to the first embodiment of the present invention comprises the following steps.

S11: Start;

S12: Provide a first lighting device, wherein the first lighting device at least comprises a first light source set, a first sensing element, a first electromagnetic wireless communication module and a first controlling circuit, wherein the first controlling circuit is electrically connected with the first light source set, the first sensing element and the first electromagnetic wireless communication module;

S13: Provide a second lighting device, wherein the second lighting device at least comprises a second light source set, a second electromagnetic wireless communication module and a second controlling circuit, wherein the second controlling circuit is electrically connected with the second light source set and the second electromagnetic wireless communication module; and S14: Establish a communication channel between the first electromagnetic wireless communication module and the second electromagnetic wireless communication module according to an environmental sensing result of the first sensing element, so that a light intensity of the first light source set and/or the second light source set is correspondingly controlled;

S15: End.

Figure 15:
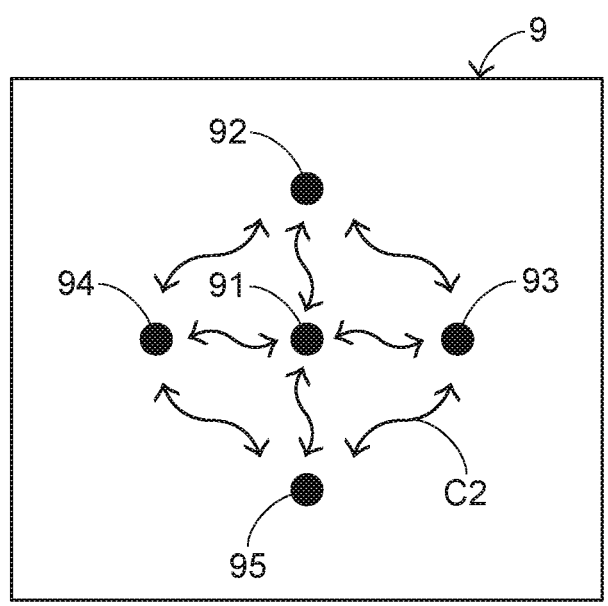
FIG. 15 schematically illustrates a group control mechanism of a sensing type lighting group including plural sensing type lighting devices according to a second embodiment of the present invention.

FIG. 15 schematically illustrates a group control mechanism of a sensing type lighting group including plural sensing type lighting devices according to a second embodiment of the present invention. As shown in FIG. 15, five lighting devices 91~95 are located within a detection space 9. Each of the lighting devices 91~95 is a sensing type lighting device with both of a sensing element and an electromagnetic wireless communication module. In addition, each of the lighting devices 91~95 has both of a master control function and a controlled function.

According to the results of sensing the light intensity changes of sub-regions of respective lighting devices 91~95, the lighting devices 91~95 issues or transmits back a lighting control command C2 to other lighting devices in an electromagnetic wireless communication manner. Moreover, a lighting control program may be executed by these lighting devices 91~95 collaboratively. Consequently, a more elaborate lighting balance mechanism can be coordinated.

It is noted that the lighting control command C2 is presented herein for purpose of illustration and description only. That is, these lighting devices 91~95 may issue other control commands to execute other additional functions that are mentioned above.

Figure 16:
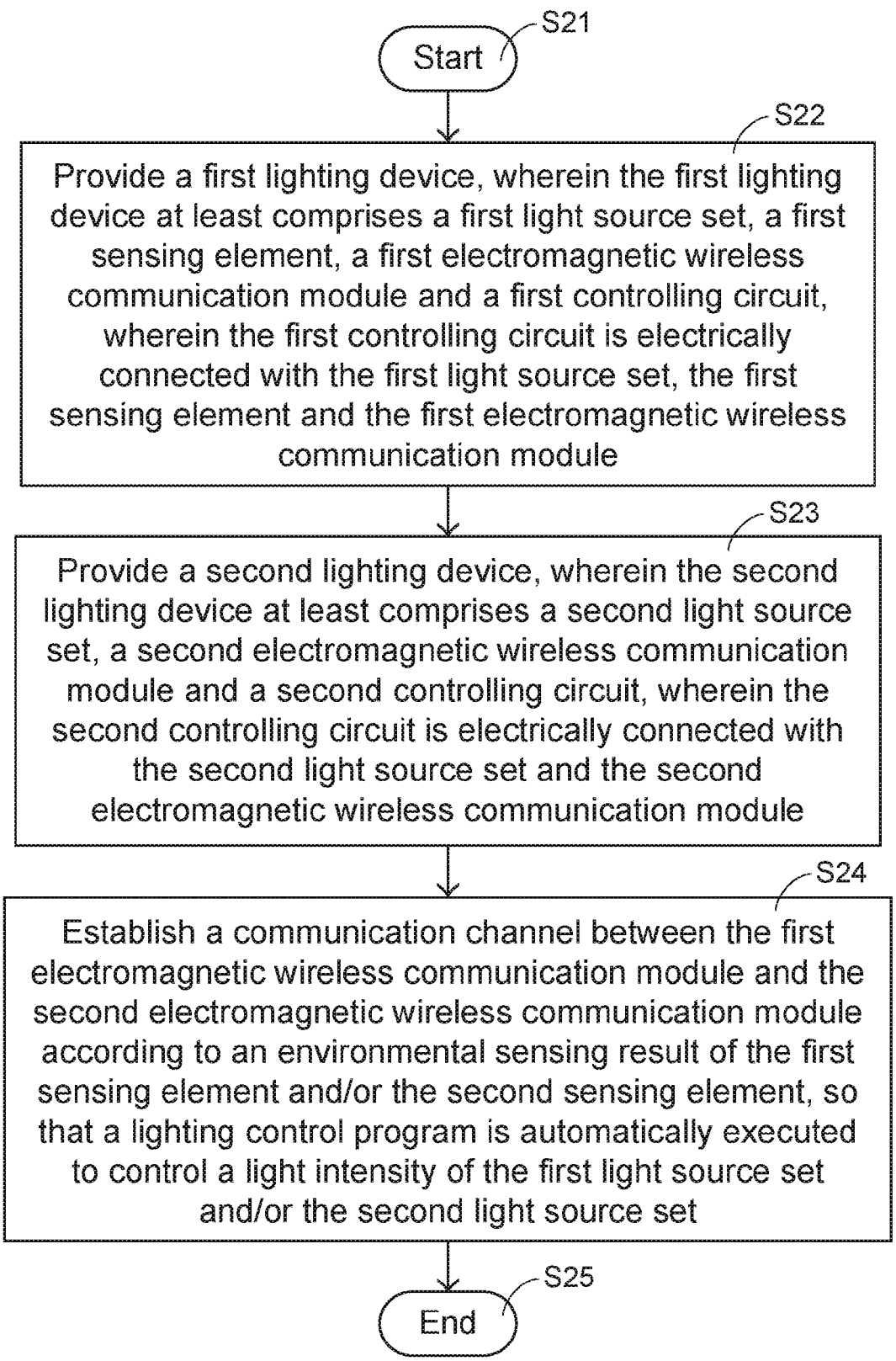
FIG. 16 is a flowchart illustrating a method of performing the group control mechanism according to the second embodiment of the present invention.

A flowchart of a method of performing the group control mechanism according to the second embodiment of the present invention will be described with reference to FIG. 16.

S21: Start;

S22: Provide a first lighting device, wherein the first lighting device at least comprises a first light source set, a first sensing element, a first electromagnetic wireless communication module and a first controlling circuit, wherein the first controlling circuit is electrically connected with the first light source set, the first sensing element and the first electromagnetic wireless communication module;

S23: Provide a second lighting device, wherein the second lighting device at least comprises a second light source set, a second electromagnetic wireless communication module and a second controlling circuit, wherein the second controlling circuit is electrically connected with the second light source set and the second electromagnetic wireless communication module; and S24: Establish a communication channel between the first electromagnetic wireless communication module and the second electromagnetic wireless communication module according to an environmental sensing result of the first sensing element and/or the second sensing element, so that a lighting control program is automatically executed to control the light intensity of the first light source set and/or the second light source set;

S25: End.

Figure 17:
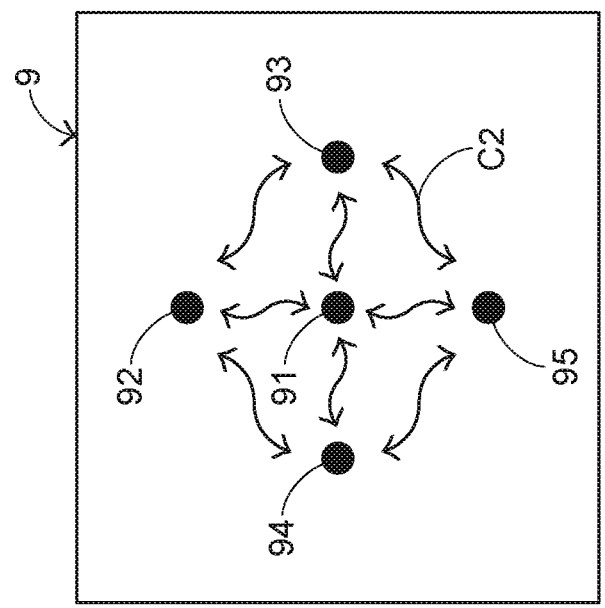
FIG. 17 schematically illustrates a group control mechanism of a sensing type lighting group according to a third embodiment of the present invention by integrating the concepts of the group control mechanism of FIG. 13 with the group control mechanism of FIG. 15.
Figure 17:
Figure 17:
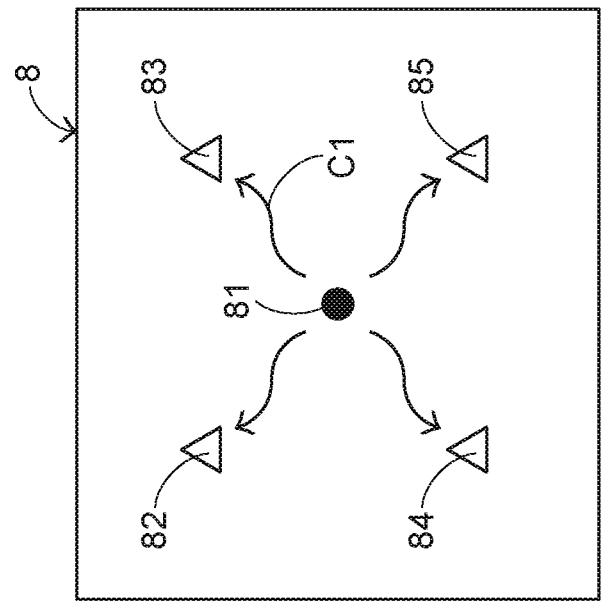

The present invention also relates to another group control mechanism of a sensing type lighting group in different spaces or different regions. This group control mechanism may be implemented by installing additional electromagnetic wireless communication modules. FIG. 17 schematically illustrates a group control mechanism of a sensing type lighting group according to a third embodiment of the present invention by integrating the concepts of the group control mechanism of FIG. 13 with the group control mechanism of FIG. 15. In this embodiment, the sensing type lighting device 81 may be in communication with and in coordination with the lighting devices 91~95 through a lighting control command C3 and another lighting control program.

From the above descriptions, the design of the present invention and the arrangement of the group control mechanism can obviously reduce the cost of initial installation of the sensing type lighting device. Consequently, the sensing type lighting device of the present invention can be widely adopted. Moreover, when the sensing type lighting device of the present invention and another sensing type lighting device cooperate, the lighting interference or inconsistence between these two lighting devices or other adverse factors are eliminated. Moreover, by the controlling method of the present invention, it is easy to elaborately control and equilibrate the lighting effects of plural sensing type lighting devices within the same space. Moreover, if a sensing type lighting device is expected to provide an additional control function and further cooperated the additional control function that is integrated with the electromagnetic wireless communication function (e.g. a music playing function or a safety monitoring function or a voice control function), the present invention can implement the group control mechanism in a cost-effective manner. In other words, the present invention has industrial applicability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sensing type lighting group, comprising:
    a first lighting device at least comprising a first light source set, a first sensing element, a first electromagnetic wireless communication module and a first controlling circuit, wherein said first controlling circuit is electrically connected with said first light source set, said first sensing element and said first electromagnetic wireless communication module, and said first sensing element performs environmental sensing to sense whether a human body moves or an objected is moved; and
    a second lighting device at least comprising a second light source set, a second electromagnetic wireless communication module and a second controlling circuit, wherein said second controlling circuit is electrically connected with said second light source set and said second electromagnetic wireless communication module,
    wherein according to an environmental sensing result of said first sensing element, a light intensity of said first light source set is actively controlled, and via a communication channel between said first electromagnetic wireless communication module and said second electromagnetic wireless communication module, a light intensity of said second light source set is correspondingly controlled.

2. The sensing type lighting group according to claim 1, wherein said light intensity of said second light source set of said second lighting device is controlled in response to a control command transmitted from said first lighting device to said second lighting device via said communication channel when said light intensity of said first light source set is actively controlled.

3. The sensing type lighting group according to claim 2, wherein said second lighting device further comprises a second sensing element performing environmental sensing to sense whether a human body moves or an objected is moved, wherein a lighting control program is automatically executed to control said light intensity of said first light source set and/or said second light source set according to said environmental sensing result of said first lighting device and/or said second lighting device.

4. The sensing type lighting group according to claim 3, wherein
    each of said first sensing element and said second sensing element is a passive infrared human body sensor or a microwave sensor; or
    each of said first lighting device and said second lighting device is at least selected from one of a sensing type LED light bulb, a sensing type LED light tube, a sensing type lamp and a sensing type work lamp, wherein said sensing type lamp is at least selected from a sensing type ceiling lamp or a sensing type garden lamp, and said sensing type work lamp is at least selected from a sensing type work lamp with a spraying function or a sensing type work lamp with a humidifying function.

5. The sensing type lighting group according to claim 1, wherein said second lighting device further comprises a second sensing element performing environmental sensing to sense whether a human body moves or an objected is moved, wherein a lighting control program is automatically executed to control said light intensity of said first light source set and/or said second light source set according to said environmental sensing result of said first lighting device and/or said second lighting device.

6. The sensing type lighting group according to claim 5, wherein
    each of said first sensing element and said second sensing element is a passive infrared human body sensor or a microwave sensor; or
    each of said first lighting device and said second lighting device is at least selected from one of a sensing type LED light bulb, a sensing type LED light tube, a sensing type lamp and a sensing type work lamp, wherein said sensing type lamp is at least selected from a sensing type ceiling lamp or a sensing type garden lamp, and said sensing type work lamp is at least selected from a sensing type work lamp with a spraying function or a sensing type work lamp with a humidifying function.

7. The sensing type lighting group according to claim 1, wherein
    each of said first electromagnetic wireless communication module and said second electromagnetic wireless communication module is operated in a frequency band of an invisible light spectrum, wherein each of said first electromagnetic wireless communication module and said second electromagnetic wireless communication module is at least selected from one of a 313.325 MHz wireless communication module, a 433 MHz wireless communication module, a 418 MHz wireless communication module, a 2.4 GHz wireless communication module, a 5.8 GHz wireless communication module, a 10 GHz wireless communication module, a Bluetooth wireless communication module, a Wi-Fi wireless communication module, a NFC wireless communication module, a Z-Wave wireless communication module and a ZigBee wireless communication module; or at least one of said first lighting device and said second lighting device further comprises at least one of a music player, a safety monitoring device, a voice-controlled switch, a light-controlled switch and/or a solar battery.

8. A controlling method for a sensing type lighting group, said controlling method at least comprising steps of:
   providing a first lighting device, wherein said first lighting device at least comprises a first light source set, a first sensing element, a first electromagnetic wireless communication module and a first controlling circuit, wherein said first controlling circuit is electrically connected with said first light source set, said first sensing element and said first electromagnetic wireless communication module, and said first sensing element performs environmental sensing to sense whether a human body moves or an objected is moved;
   providing a second lighting device, wherein said second lighting device at least comprises a second light source set, a second electromagnetic wireless communication module and a second controlling circuit, wherein said second controlling circuit is electrically connected with said second light source set and said second electromagnetic wireless communication module; and
   establishing a communication channel between said first electromagnetic wireless communication module and said second electromagnetic wireless communication module, wherein a light intensity of said first light source set is actively controlled according to an environmental sensing result of said first sensing element, and via the communication channel, a light intensity of said second light source set is correspondingly controlled.

9. The controlling method according to claim 8, wherein said light intensity of said second light source set of said second lighting device is controlled in response to a control command transmitted from said first lighting device to said second lighting device via said communication channel when said light intensity of said first light source set is actively controlled.

10. The controlling method according to claim 9, wherein said second lighting device further comprises a second sensing element performing environmental sensing to sense whether a human body moves or an objected is moved, wherein a lighting control program is automatically executed to control said light intensity of said first light source set and/or said second light source set according to said environmental sensing result of said first lighting device and/or said second lighting device.

11. The controlling method according to claim 10, wherein
   each of said first sensing element and said second sensing element is a passive infrared human body sensor or a microwave sensor; or
   each of said first lighting device and said second lighting device is at least selected from one of a sensing type LED light bulb, a sensing type LED light tube, a sensing type lamp and a sensing type work lamp, wherein said sensing type lamp is at least selected from a sensing type ceiling lamp or a sensing type garden lamp, and said sensing type work lamp is at least selected from a sensing type work lamp with a spraying function or a sensing type work lamp with a humidifying function.

12. The controlling method according to claim 8, wherein
   each of said first electromagnetic wireless communication module and said second electromagnetic wireless communication module is operated in a frequency band of an invisible light spectrum, wherein each of said first electromagnetic wireless communication module and said second electromagnetic wireless communication module is at least selected from one of a 313.325 MHz wireless communication module, a 433 MHz wireless communication module, a 418 MHz wireless communication module, a 2.4 GHz wireless communication module, a 5.8 GHz wireless communication module, a 10 GHz wireless communication module, a Bluetooth wireless communication module, a Wi-Fi wireless communication module, a NFC wireless communication module, a Z-Wave wireless communication module and a ZigBee wireless communication module; or
   at least one of said first lighting device and said second lighting device further comprises at least one of a music player, a safety monitoring device, a voice-controlled switch, a light-controlled switch and/or a solar battery.

* * * * *